United States Patent
Su et al.

(10) Patent No.: US 7,876,892 B1
(45) Date of Patent: Jan. 25, 2011

(54) MULTIPLE ECHO CANCELLATION USING A FIXED FILTER DELAY

(75) Inventors: Huan-Yu Su, San Clemente, CA (US); Jonathan Peace, Rancho Mirage, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 1433 days.

(21) Appl. No.: 11/318,375

(22) Filed: Dec. 22, 2005

(51) Int. Cl.
*H04M 9/08* (2006.01)
(52) U.S. Cl. .................. 379/406.04
(58) Field of Classification Search ............ 379/406.04
See application file for complete search history.

(56) References Cited

U.S. PATENT DOCUMENTS 5,400,394 A * 3/1995 Raman et al. ............ 379/88.07

* cited by examiner

*Primary Examiner*—Alexander Jamal
(74) *Attorney, Agent, or Firm*—Farjami & Farjami LLP

(57) ABSTRACT

There is provided a method for use by an echo canceller to cancel a far echo at a variable delay and a near echo at a fixed delay. The method comprises constructing an echo signal model based on an incoming signal, determining a variable echo delay for a far echo caused by a far echo source, determining a fixed echo delay for a near echo caused by a near echo source, subtracting the echo signal model from an outgoing signal at a window placed around the variable echo delay to cancel far echo, e.g. when the echo canceller determines existence of the far echo, and subtracting the echo signal model from the outgoing signal at a window placed around the fixed echo delay to cancel near echo, e.g. regardless of existence of the near echo, wherein the fixed echo delay is smaller than the variable echo delay.

18 Claims, 4 Drawing Sheets

MULTIPLE ECHO CANCELLATION USING A FIXED FILTER DELAY

BACKGROUND OF THE INVENTION

1. Field of the Invention

The present invention relates generally to echo cancellation in communication networks. More particularly, the present invention relates to canceling secondary echoes in communication networks.

2. Background Art

Subscribers use speech quality as the benchmark for assessing the overall quality of a telephone network. A key technology to provide a high quality speech is echo cancellation. Echo canceller performance in a telephone network, either a TDM or packet telephony network, has a substantial impact on the overall voice quality. An effective removal of hybrid echo inherent in telephone networks is a key to maintaining and improving perceived voice quality during a call.

Echoes occur in telephone networks due to impedance mismatches of network elements and acoustical coupling within telephone handsets. Hybrid echo is the primary source of echo generated from the public-switched telephone network (PSTN). As shown in FIG. 1, hybrid echo 127 is created by a hybrid (not shown) within SLIC (Subscriber Line Interface Circuit) 125 of PSTN 120, which converts a four-wire physical interface into a two-wire physical interface for communication with telephone 110 having a two-wire physical interface. SLIC 125 includes a switched hybrid circuit operable during a POTS (Plain Old Telephone Service or System) mode when the associated subscriber is using a POTS station and in an ISDN (Integrated Services Digital Network) mode when the subscriber is using an ISDN station. The hybrid circuit includes a first amplifier circuit for coupling a signal at the two-wire port thereof to its four-wire transmit port, and a second amplifier circuit for coupling a signal at the four-wire receive port of the hybrid to the two-wire port. The hybrid reflects electrical energy back to the speaker from the four-wire physical interface.

As shown in FIG. 1, in conventional telephone network 100, VoIP (Voice over Internet Protocol) device 140 at Central Office (CO) 140 includes echo canceller 140 that is typically positioned between SLIC 125 and packet network 150. Generally speaking, echo cancellation process involves two steps. First, as the call is set up, echo canceller 145 employs a digital adaptive filter to adapt to the far-end signal and create a model based on the far-end signal before passing through the hybrid within SLIC 125. After the local-end signal, including near-end signal and/or echo signal, passes through the hybrid, echo canceller 145 subtracts the far-end model from the local-end signal to cancel hybrid echo and generate an error signal. Although this echo cancellation process removes a substantial amount of the echo, non-linear components of the echo may still remain. To cancel non-linear components of the echo, the second step of the echo cancellation process utilizes a non-linear processor (NLP) to eliminate the remaining or residual echo by attenuating the signal below the noise floor.

Today, conventional echo cancellers may be SPARSE echo cancellers, which employ adaptive filter algorithms with a dynamically positioned window to cover a desired echo tail length, such as a sliding window, e.g. a 24 ms window, covering an echo path delay, e.g. a 128 ms delay. To properly cancel the echo, the echo canceller must determine a pure delay or a bulk delay, which is indicative of the location of the echo signal segment or window within the 128 ms echo path delay. Non-SPARSE echo cancellers, on the other hand, utilize a 128 ms window, which covers the entire echo path delay, and do not need to determine the bulk delay. However, non-SPARSE echo cancellers are not as desirable as SPARSE echo cancellers due to high complexity and high cost, and further due to slow convergence because of the long echo tail and the higher number of tabs required for the adaptive filter.

Although conventional sparse echo cancellers aim to cancel the above-described primary echo caused by the hybrid within SLIC 125 of PSTN 120, conventional sparse echo cancellers fail to properly address and cancel additional secondary echoes in the network, which are not originated by the hybrid within SLIC 125 or by other equipment in the vicinity of SLIC 125. Conventional sparse echo cancellers operate based on a false assumption that the line echo occurs only at the hybrid in PSTN 120 due to the conversion a four-wire physical interface into a two-wire physical interface for communication with telephone 110, or in the vicinity of the hybrid in PSTN 120.

Since sparse echo cancellers need to dynamically determine the echo bulk delay, due to signal conditions, such as echo to noise ratio and talker loudness differences, it is possible to make wrong echo bulk delay decisions, which would result in a lack of echo control capability. This problem is even more pronounced when there is multiple echo sources with different bulk delays and different echo energy. Even by using multiple sparse active filter windows, a secondary echo location may not be correctly determined.

Accordingly, there is a need in the art for echo cancellers that cancel secondary echoes, as well as the primary echo, efficiently and effectively, and with a low level of complexity and memory consumption.

SUMMARY OF THE INVENTION

The present invention is directed to a method for use by an echo canceller to cancel a far echo at a variable delay and a near echo at a fixed delay. In one aspect, the method comprises constructing an echo signal model based on an incoming signal, determining a variable echo delay for a far echo caused by a far echo source, determining a fixed echo delay for a near echo caused by a near echo source, subtracting the echo signal model from an outgoing signal at a window placed around the variable echo delay to cancel far echo, and subtracting the echo signal model from the outgoing signal at a window placed around the fixed echo delay to cancel near echo, wherein the fixed echo delay is smaller than the variable echo delay.

In a further aspect, the fixed echo delay is determined once by the echo canceller based on a comparison of the incoming signal and the outgoing signal, and may be less than 5 ms. In another aspect, the fixed echo delay is programmed into the echo canceller and without determination by the echo canceller.

In an additional aspect, the subtraction of the echo signal model from the outgoing signal at the window placed around the variable echo delay occurs only if the echo canceller determines existence of the far echo, and the subtraction of the echo signal model from the outgoing signal at the window placed around the fixed echo delay occurs regardless of existence of the near echo.

In yet another aspect, the method further comprises determining a window size for the window placed around the fixed echo delay, wherein the window size for the window placed around the fixed echo delay is smaller than a window size for the window placed around the variable echo delay.

In a separate aspect, an echo canceller is provided for cancelling a far echo at a variable delay and a near echo at a fixed delay. The echo canceller comprises an adaptive filter configured to construct an echo signal model based on an incoming signal; a fixed and variable delay estimator configured to determine a variable echo delay for a far echo caused by a far echo source, and to determine a fixed echo delay for a near echo caused by a near echo source; and a subtractor configured to subtract the echo signal model from an outgoing signal at a window placed around the variable echo delay to cancel far echo, and to subtract the echo signal model from the outgoing signal at a window placed around the fixed echo delay to cancel near echo; wherein the fixed echo delay is smaller than the variable echo delay.

In one aspect, the subtractor subtracts the echo signal model from the outgoing signal at the window placed around the variable echo delay only if the echo canceller determines existence of the far echo, and the subtractor subtracts the echo signal model from the outgoing signal at the window placed around the fixed echo delay regardless of existence of the near echo.

Other features and advantages of the present invention will become more readily apparent to those of ordinary skill in the art after reviewing the following detailed description and accompanying drawings.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
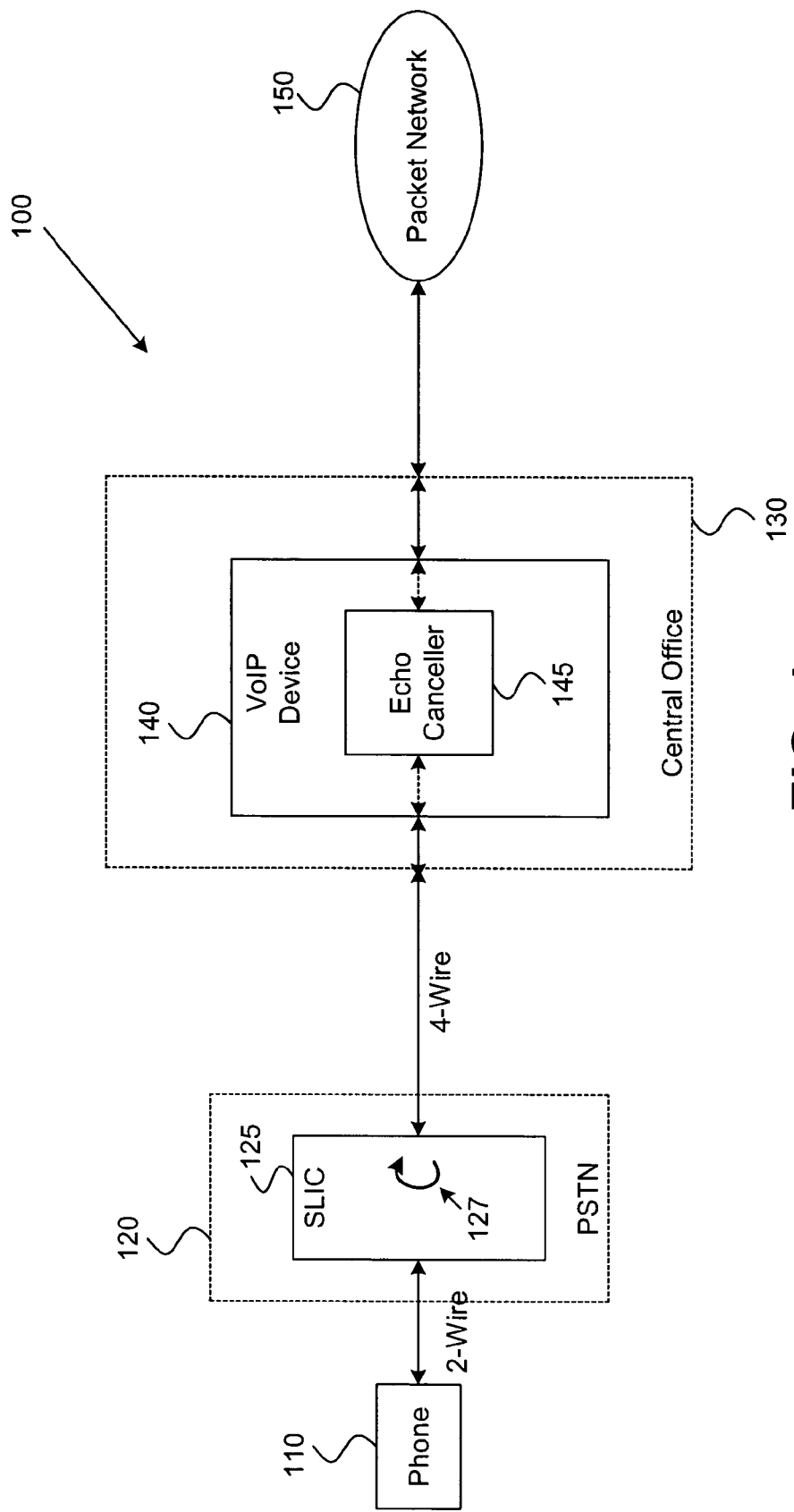
FIG. 1 illustrates a block diagram of a communication system generating a primary echo, and a placement of an echo canceller therein.

Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

Figure 2:
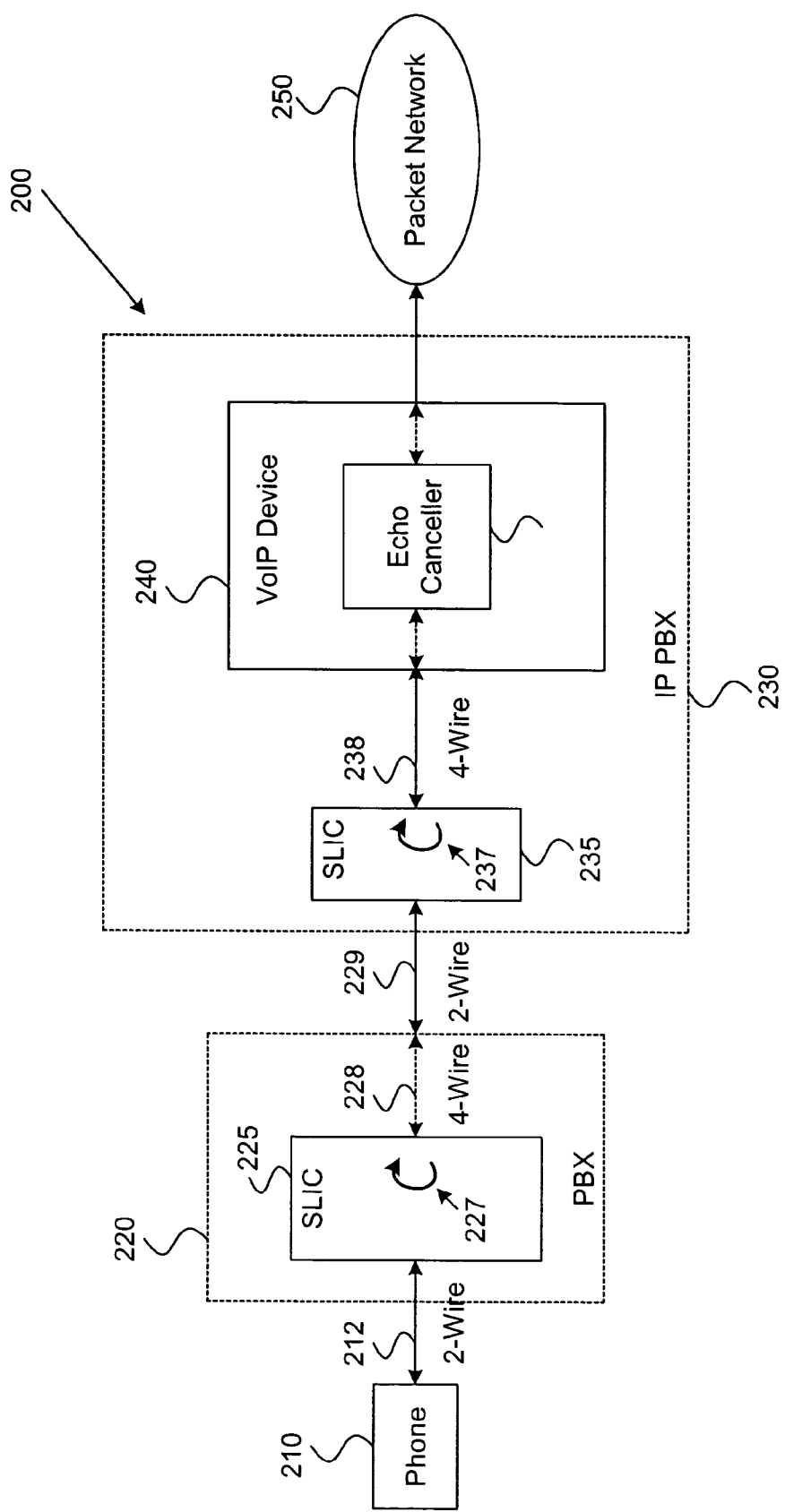
FIG. 2 illustrates a block diagram of a communication system generating a primary echo and a secondary echo, and a placement of an echo canceller therein.

FIG. 2 illustrates telephone network 200 including PBX hybrid echo 227 created by a hybrid (not shown) within SLIC (Subscriber Line Interface Circuit) 225 of PBX (Private Business eXchange) 220, which converts four-wire connection 228 into two-wire connection 212 for communication with telephone 210 having a two-wire physical interface, similar to FIG. 1. However, unlike telephone network 100, where the connection between CO 130 and PSTN 120 is facilitated using a 4-wire connection, telephone network 200 shows central office 2-wire connection 229 facilitating the connection between IP PBX 230 and PBX 220 for cost reduction purposes by service providers. Therefore, in addition to SLIC 225 (or far echo source), telephone network 200 also includes SLIC 235 (or near echo source) for conversion of 2-wire connection 229 into 4-wire connection 238 for communication with VoIP device 240, which results in generation of IP PBX hybrid echo 237. IP PBX hybrid echo 237 is generated as a result of the conversion of 2-wire connection 229 into 4-wire connection 238, and occurs near or in close vicinity of VoIP device 240. It should be noted the present invention is also applicable to the configuration of FIG. 1, where PBX 220 may be a PSTN and IP PBX may be a CO.

Figure 3:
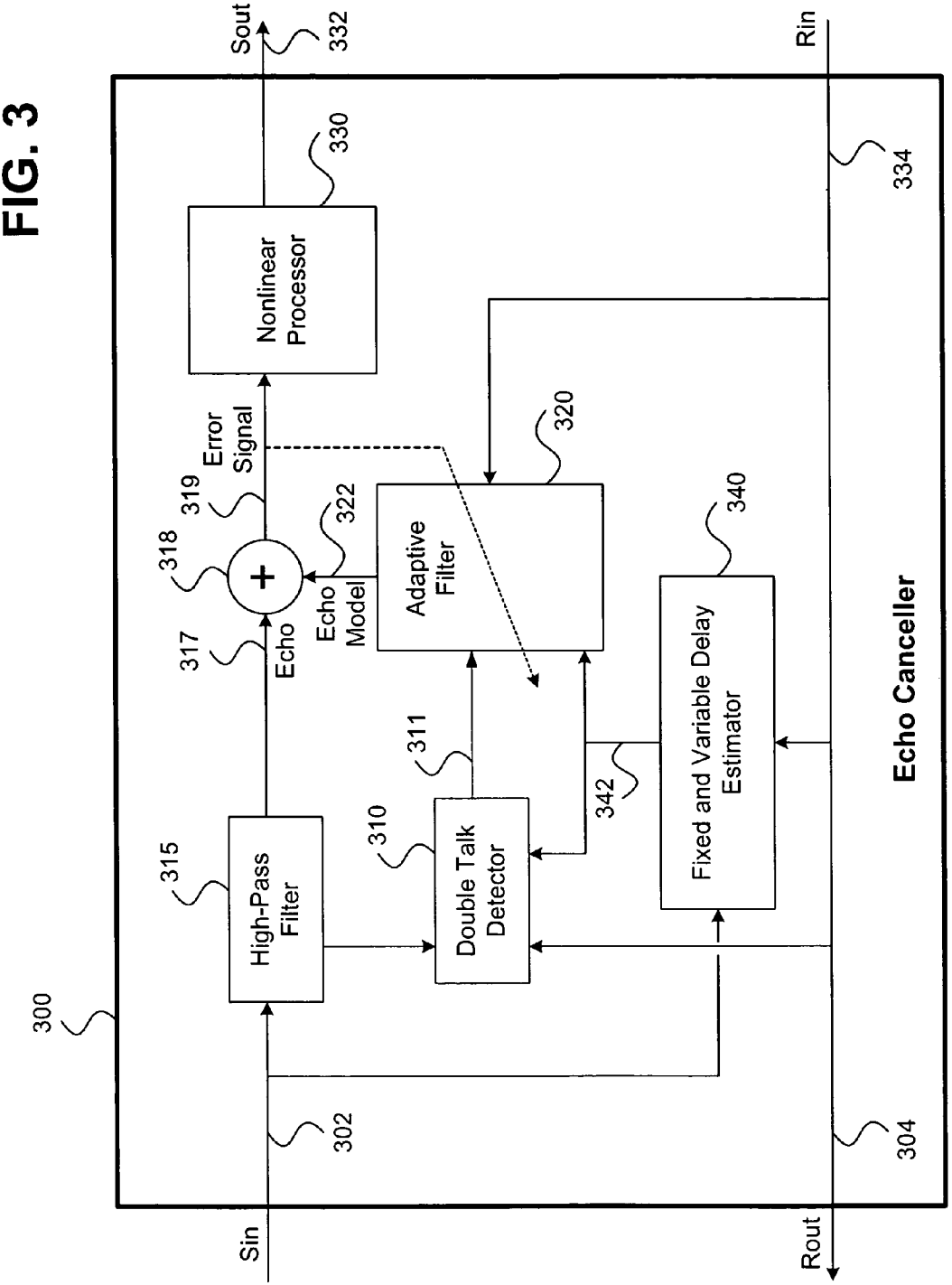
FIG. 3 illustrates a block diagram of an echo canceller for detecting and canceling the primary echo and the secondary echo of FIG. 2, according to one embodiment of the present invention.

Echo canceller 245 of the present invention is configured to not only cancel PBX hybrid echo 227, but also IP PBX hybrid echo 237 generated near or in close vicinity of VoIP device 240, prior to transmission of the signal by VoIP device 240 over packet network 250. Turning to FIG. 3, it illustrates a block diagram of echo canceller 300, according to one embodiment of the present invention. As shown, echo canceller 300 includes double talk detector 310, high-pass filter 315, adaptive filter 320, fixed and variable delay estimator 340, error estimator or subtractor 318 and nonlinear processor 330. During its operation, echo canceller 300 receives Rin signal 334 from the far end, which is fed to double talk detector 310, adaptive filter 320 and fixed and variable delay estimator 340, and then Rin signal 334 is passed through as Rout signal 304 to SLIC 235 and PBX 220 including SLIC 225. As discussed above, IP PBX hybrid echo 237 and PBX hybrid echo 227 cause Rout signal 304 to be reflected as part of Sin signal 302 from the near end, which is fed to high pass filter 315, and an output of high pass filter 315 is fed to double talk detector 310. High-pass filter 315, which is placed at the transmitting side of echo canceller 300, removes DC component from Sin signal 302.

Double talk detector 310 controls the behavior of adaptive filter 320 by providing double talk indication 311 during periods when Sin signal 302 from the near end reaches a certain level.

Because echo canceller 300 is utilized to cancel an echo of Rin signal 334, presence of speech signal from the near end would cause adaptive filter 320 to converge on a combination of near end speech signal and Rin signal 334, which will lead to an inaccurate echo path model, i.e. incorrect adaptive filter 320 coefficients. Therefore, in order to cancel the echo signal, adaptive filter 320 should not train in the presence of the near end speech signal. To this end, echo canceller 300 must analyze the incoming signal and determine whether it is solely an echo signal of Rin signal 334 or also contains the speech of a near end talker. By convention, if two people are talking over a communication network or system, one person is referred to as the "near talker," while the other person is referred to as the "far talker." The combination of speech signals from the near end talker and the far end talker is referred to as "double talk."

To determine whether Sin signal 302 contains double talk, double talk detector 310 estimates and compares the characteristics of Rin signal 334 and Sin signal 302. A primary purpose of double talk detector is to prevent adaptive filter 320 from adaptation when double talk is detected or to adjust the degree of adaptation based on confidence level of double talk detection.

Echo canceller 300 utilizes adaptive filter 320 to model the echo signal. In one embodiment, adaptive filter 320 uses a transversal filter with adjustable taps, where each tap receives a coefficient that specifies the magnitude of the corresponding output signal sample and each tap is spaced a sample time apart. The better the echo canceller can estimate what the echo signal will look like, the better it can eliminate the echo. To improve the performance of echo canceller 300, it may be desirable to vary the adaptation rate at which the transversal filter tap coefficients of adaptive filter 320 are adjusted. For instance, if double talk detector 310 denotes a high confidence level that the incoming signal is an echo signal, it is preferable for adaptive filter 320 to adapt quickly. On the other hand, if double talk detector 310 denotes a low confidence level that the incoming signal is an echo signal, i.e. it may include double talk, it is preferable to decline to adapt at all or to adapt very slowly. If there is an error in determining whether Sin signal 302 is an echo signal, a fast adaptation of adaptive filter 320 causes rapid divergence and a failure to eliminate the echo signal.

As shown in FIG. 3, adaptive filter 320 produces echo model signal 322 based on Rin signal 334 from the far end. Error estimator 318 receives echo signal 317, which is the output of high-pass filter 315, and subtracts echo model signal 322 from echo signal 317 to generate residual echo signal or error signal 319. Adaptive filter 320 also receives error signal 319 and updates its coefficients based on error signal 319.

It is known that the echo path includes nonlinear components that cannot be removed by adaptive filter 320 and, thus, after subtraction of echo model signal 322 from echo signal 317, there remains residual echo, which must be eliminated by nonlinear processor (NLP) 330. As shown NLP 330 receives residual echo signal or error signal 319 from error estimator 318 and generates Sout 320 for transmission to far end. If error signal 319 is below a certain level, NLP 330 replaces the residual echo with either comfort noise if the comfort noise option is enabled, or with silence if the comfort noise option is disabled.

With continued reference to FIG. 3, echo canceller 300 also includes fixed and variable delay estimator 340. In a preferred embodiment, adaptive filter 320 is a SPARSE filter and employs adaptive filter algorithms with a dynamically positioned window to cover a desired echo tail length for cancelling PBX hybrid echo 227. In such embodiment, echo canceller 300 uses a sliding window, e.g. a 24 ms window, covering an echo path delay, e.g. a 128 ms delay. To properly cancel PBX hybrid echo 227, echo canceller 300 must determine and track the delay of PBX hybrid echo 227, which is indicative of the location of PBX hybrid echo 227 segment or window within the 128 ms echo path delay. In one embodiment, fixed and variable delay estimator 340 determines the echo delay for PBX hybrid echo 227 as well as the echo delay for IP PBX hybrid echo 237. In such embodiment, the echo delay for PBX hybrid echo 227 is determined by fixed and variable delay estimator 340 as known in the art and tracked continuously, and further, the echo delay for IP PBX hybrid echo 237 is determined by fixed and variable delay estimator 340 based on a fixed delay value provided during design, configuration or programming by a host device. For example, based on measurements at IP PBX 230, the echo delay for IP PBX hybrid echo 237 may be determined and programmed into VoIP device 240 or written into a memory location or register of VoIP device 240. In other embodiments, fixed and variable delay estimator 340 may once measure and determine the fixed delay value similar to determining the echo delay for IP PBX hybrid echo 237, as known in the art, e.g., based on comparison of Rin signal 334 and Sin signal 302 to find an echo of Rin signal 334 in Sin signal 302. Typically, the fixed delay for IP PBX hybrid echo 237 is less than 5 ms.

Further, in addition to determining the echo delay for IP PBX hybrid echo 237, fixed and variable delay estimator 340 also determines the length of window for canceling IP PBX hybrid echo 237. As explained above, in non-SPARSE echo cancellers, a 128 ms window may be used for cancelling PBX hybrid echo 227, and in SPARSE echo cancellers, a 24 ms window within the 128 ms echo delay path may be used for cancelling PBX hybrid echo 227 based on a determination of the variable echo delay for PBX hybrid echo 227. However, in an embodiment of the present invention, fixed and variable delay estimator 340 determines a fixed IP PBX window size in a SPARSE filter for cancelling IP PBX hybrid echo 237, where the IP PBX window size is smaller than the window size used for cancelling PBX hybrid echo 227. Similar to determining the echo delay for IP PBX hybrid echo 237, the IP PBX window size may be provided during design, configuration or programming by a host device. For example, based on measurements at IP PBX 230, the IP PBX window size for cancelling IP PBX hybrid echo 237 may be determined and programmed into VoIP device 240 or written into a memory location or register of VoIP device 240. In other embodiments, fixed and variable delay estimator 340 may once measure and determine the IP PBX window size based on the length of echo. Typically, the IP PBX window size for cancelling IP PBX hybrid echo 237 is around 5-10 ms.

In an embodiment of the present application, adaptive filter 320 produces echo model signal 322 that is utilized for cancelling both PBX hybrid echo 227 and IP PBX hybrid echo 237. For example, adaptive filter 320 will include non-zero coefficients where the windows for cancelling PBX hybrid echo 227 and IP PBX hybrid echo 237 appear within the echo path delay of 128 ms.

Figure 4:
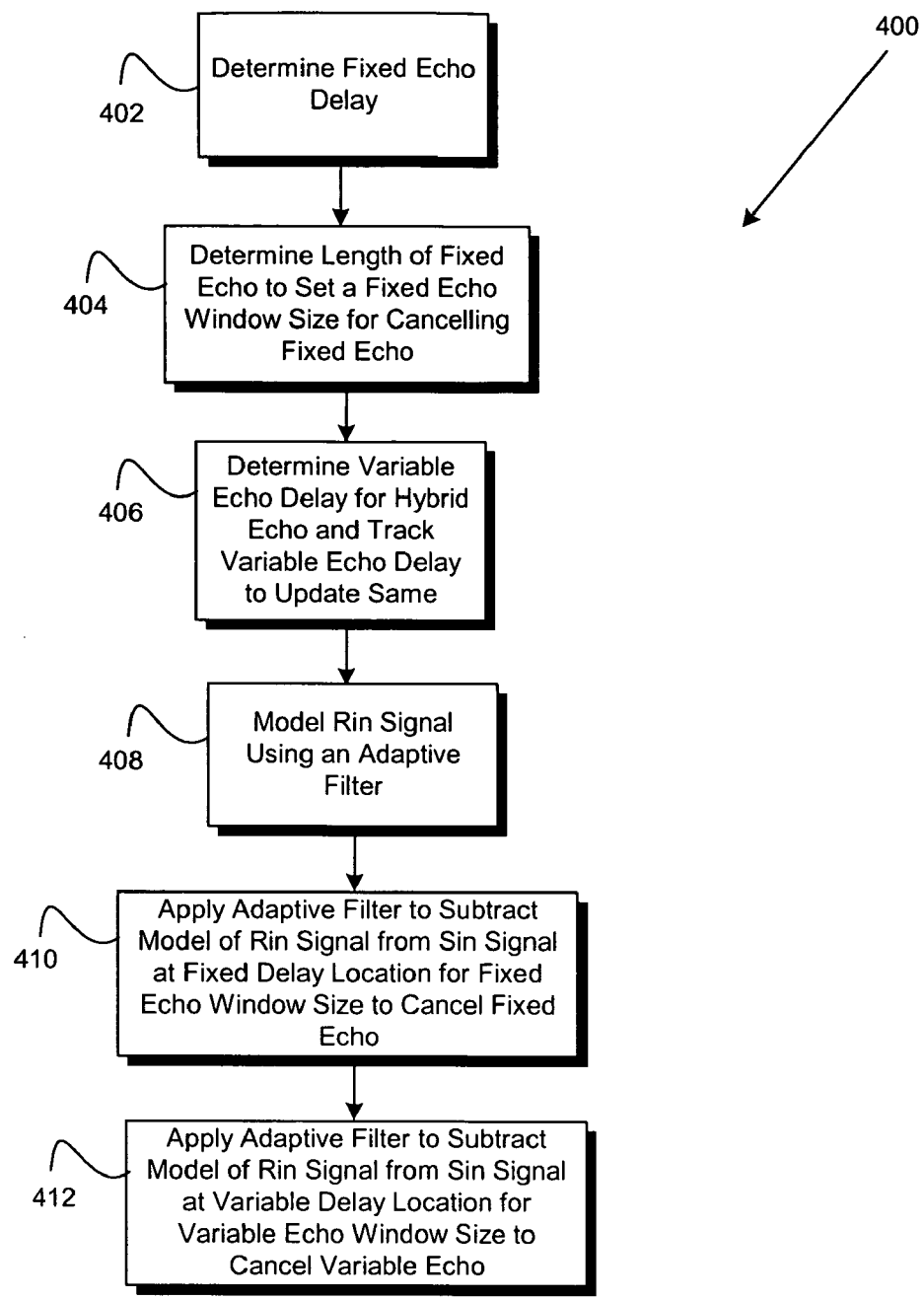
FIG. 4 illustrates a flow diagram for use in conjunction with the echo canceller of FIG. 3 for detecting and canceling the primary echo and the secondary echo of FIG. 2, according to one embodiment of the present invention.

FIG. 4 illustrates echo cancellation method 400 for use by echo canceller 300 of FIG. 3, according to one embodiment of the present application. Echo cancellation method 400 begins at step 402, where fixed and variable delay estimator 340 may determine the fixed echo delay (which may also be referred to as secondary or near echo in the present application), as described in conjunction with FIG. 3. Next, at step 404, fixed and variable delay estimator 340 determines length of fixed echo to set the fixed echo window size for cancelling the fixed echo, such as IP PBX hybrid echo 237, as described above in conjunction with FIG. 3. At step 406, fixed and variable delay estimator 340 determines the variable echo delay for PBX hybrid echo 227 (which may also be referred to as primary or variable echo in the present application) and further tracks the variable echo delay, so as to apply the window for cancelling PBX hybrid echo 227 at the right location. At step 408, adaptive filter 320 models Rin signal 334. At step 410, the model of Rin signal 334 constructed by adaptive filter 320 is subtracted from Sin signal 302 at the fixed delay location, determined at step 402, for the length of fixed echo window size, determined at step 404, to cancel the fixed echo. At step 412, the model of Rin signal 334 constructed by adaptive filter 320 is subtracted from Sin signal 302 at the variable delay location, determined at step 406, to cancel the variable echo.

In one embodiment of the present application, at step 410, the model of Rin signal 334 constructed by adaptive filter 320 is subtracted from Sin signal 302 at the fixed delay location, without a determination by echo canceller 300 as to whether the fixed echo, such as OC hybrid echo 237, exists in Sin signal 302. However, at step 412, the model of Rin signal 334 constructed by adaptive filter 320 is subtracted from Sin signal 302 at the variable delay location, only if echo canceller 300 determines that the far echo exists in Sin signal 302. For example, such embodiment may be used when the fixed echo delay is programmed into echo canceller 300 or when echo canceller 300 determines the fixed echo delay only once.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, it is contemplated that the circuitry disclosed herein can be implemented in software, or vice versa. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method for use by an echo canceller to cancel a far echo at a variable delay and a near echo at a fixed delay, the method comprising:
    constructing an echo signal model based on an incoming signal;
    determining a variable echo delay for the far echo caused by a far echo source;
    determining a fixed echo delay for the near echo caused by a near echo source;
    subtracting the echo signal model from an outgoing signal at a window placed around the variable echo delay to cancel the far echo only if the echo canceller determines existence of the far echo; and
    subtracting the echo signal model from the outgoing signal at a window placed around the fixed echo delay to cancel the near echo regardless of existence of the near echo;
    wherein the fixed echo delay is smaller than the variable echo delay.

2. The method of claim 1, wherein the fixed echo delay is less than 5 ms.

3. The method of claim 1, wherein the fixed echo delay is determined once by the echo canceller based on a comparison of the incoming signal and the outgoing signal.

4. The method of claim 1, wherein the fixed echo delay is programmed into the echo canceller and without determination by the echo canceller.

5. The method of claim 1 further comprising determining a window size for the window placed around the fixed echo delay, wherein the window size for the window placed around the fixed echo delay is smaller than a window size for the window placed around the variable echo delay.

6. The method of claim 1 further comprising: tracking the variable echo delay.

7. An echo canceller for cancelling a far echo at a variable delay and a near echo at a fixed delay, the echo canceller comprising:
    an adaptive filter configured to construct an echo signal model based on an incoming signal;
    a fixed and variable delay estimator configured to determine a variable echo delay for the far echo caused by a far echo source, and to determine a fixed echo delay for the near echo caused by a near echo source; and
    a subtractor configured to subtract the echo signal model from an outgoing signal at a window placed around the variable echo delay to cancel the far echo only if the echo canceller determines existence of the far echo, and configured to subtract the echo signal model from the outgoing signal at a window placed around the fixed echo delay to cancel the near echo regardless of existence of the near echo;
    wherein the fixed echo delay is smaller than the variable echo delay.

8. The echo canceller of claim 7, wherein the fixed echo delay is less than 5 ms.

9. The echo canceller of claim 7, wherein the fixed echo delay is determined once by the fixed and variable delay estimator based on a comparison of the incoming signal and the outgoing signal.

10. The echo canceller of claim 7, wherein the fixed echo delay is programmed into the echo canceller and without determination by the fixed and variable delay estimator.

11. The echo canceller of claim 7, wherein the echo canceller further determines a window size for the window placed around the fixed echo delay, wherein the window size for the window placed around the fixed echo delay is smaller than a window size for the window placed around the variable echo delay.

12. The echo canceller of claim 7, wherein the fixed and variable delay estimator is further configured to track the variable echo delay.

13. A method for use by an echo canceller to cancel a far echo at a variable delay and a near echo at a fixed delay, the method comprising:
    constructing an echo signal model based on an incoming signal;
    determining a variable echo delay for the far echo caused by a far echo source;
    determining a fixed echo delay for the near echo caused by a near echo source;
    subtracting the echo signal model from an outgoing signal at a window placed around the variable echo delay to cancel the far echo, only if the echo canceller determines existence of the far echo; and
    subtracting the echo signal model from the outgoing signal at a window placed around the fixed echo delay to cancel the near echo, regardless of existence of the near echo;
    wherein the fixed echo delay is smaller than the variable echo delay.

14. The method of claim 13, wherein the fixed echo delay is less than 5 ms.

15. The method of claim 13, wherein the fixed echo delay is determined once by the echo canceller based on a comparison of the incoming signal and the outgoing signal.

16. The method of claim 13, wherein the fixed echo delay is programmed into the echo canceller and without determination by the echo canceller.

17. The method of claim 13 further comprising determining a window size for the window placed around the fixed echo delay, wherein the window size for the window placed around the fixed echo delay is smaller than a window size for the window placed around the variable echo delay.

18. The method of claim 13 further comprising: tracking the variable echo delay.

* * * * *